Patented Dec. 22, 1931

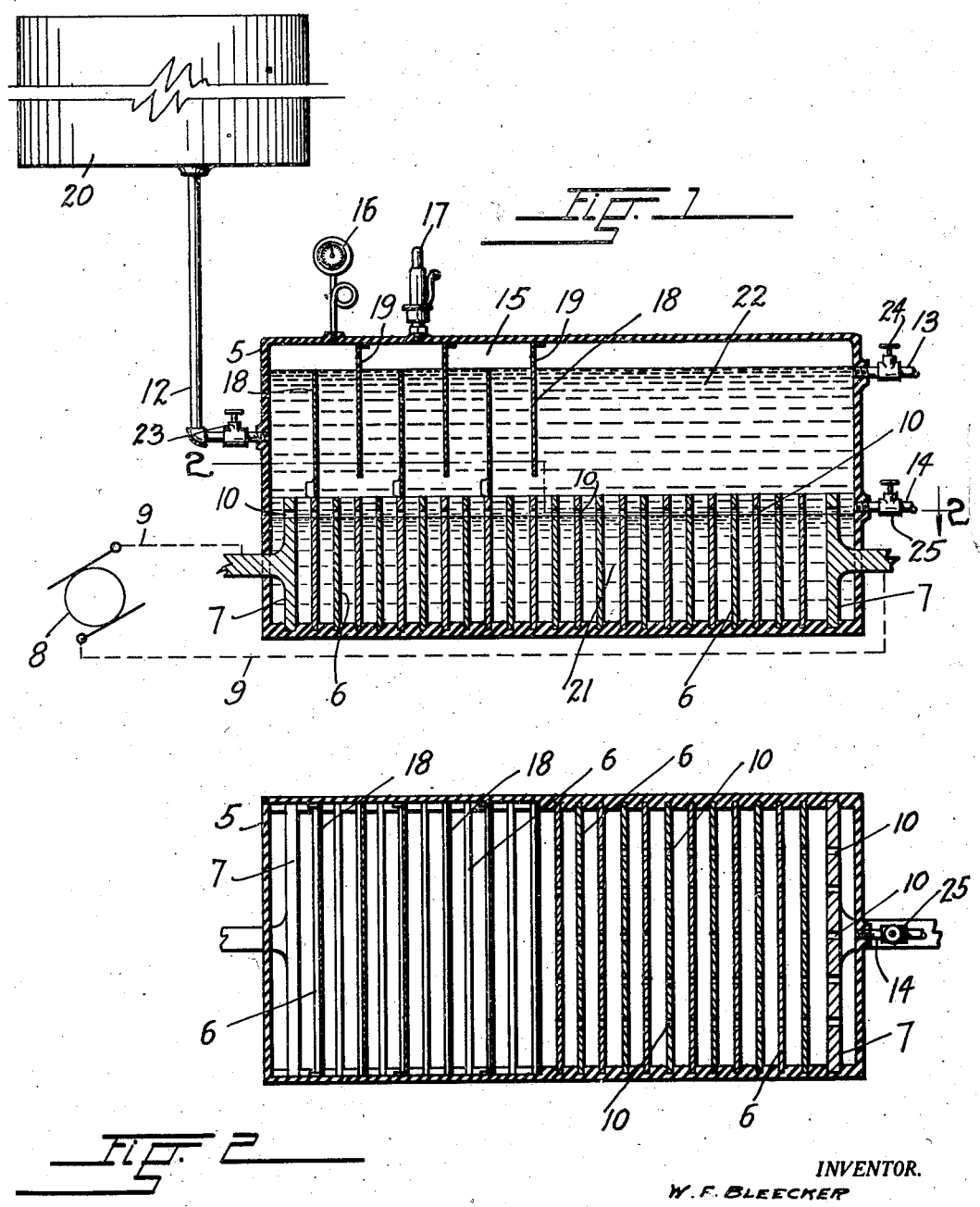

1,837,519

UNITED STATES PATENT OFFICE

WARREN F. BLEECKER, OF BOULDER, COLORADO

APPARATUS FOR THE TREATMENT OF HYDROCARBONACEOUS LIQUIDS

Application filed July 14, 1928. Serial No. 292,684.

My invention relates to apparatus for the treatment of hydrocarbonaceous liquids of the petroleum class for the purpose of rendering inactive or neutralizing certain corrosive sulfur compounds frequently found therein.

The treatment above referred to includes the generation and admission of an oxidizing gas and it is described in detail and with distinctive modifications in my applications for Patent Nos. 274,213, 274,214 and 274,215, filed on the first day of May, 1928.

It is an object of the present invention to provide an electrolytic cell in which the treatment of the petroleum may be performed expeditiously and to the best advantage. A further object is to provide a cell in which the oxidizing gas required in the process, is generated in the cell and is enclosed so that it may impregnate the oil within the cell itself or may, for the same purpose, be directed to a separate container under a pressure generated by the accumulation of gases in the cell.

In the preferred form of my invention, the oil is treated in the cell itself and an embodiment of the preferred form of the invention has been illustrated in the accompanying drawings in which, Figure 1 represents a vertical sectional elevation of a cell made according to the invention, and Figure 2 a horizontal section taken on the line 2—2, Figure 1.

Like reference characters designate corresponding parts throughout the views.

A closed container 5 of suitable dimensions and proportions is made of nonconducting material or it may be made of metal and lined throughout with a nonconductive substance. The object of this feature of the construction is to compel the current entered into the cell at one end of a series of electrodes to traverse the electrodes successively to the opposite end of the cell, instead of seeking the shortest path through a wall of the cell as would take place if the surfaces of the cell engaged by the electrolyte were, even in part, composed of a conductive substance.

A series of equidistantly spaced electrodes 6 extend in the lower portion of the container from one end of to the other.

The electrodes 7 at opposite ends of the series have terminals extending outside the container for their connection with a source of direct-current electricity 8, by a circuit indicated in lines designated by the numeral 9.

The electrodes are preferably composed of inert conductive material such as graphite, magnetite, etc., and it is desirable that the electrodes at the ends of the series be made heavier than the others to provide ample conducting area. The electrodes are held in contact with adjacent surfaces of the cell so as to prevent the passage of current around the same.

A preferred method consists in slotting the bottom and the sides of the container and fitting the edges of the electrodes in the slots, as shown in the drawings.

The electrodes are, of necessity, bi-polar, being positive on one side and negative on the other.

In the operation of the cell, it is desirable that the level of the electrolyte is not appreciably above the tops of the electrodes, and provision is therefore made for the constant discharge of surplus electrolyte as will hereinafter be more fully described.

As an additional safeguard to the accumulation of electrolyte above the electrodes, the latter may be provided with small holes 10, or as a variant with small notches, adjacent their upper edges, through which the electrolyte may pass to the outlet provided for the purpose.

The arrangement of the electrodes, as above described, prevents the electrolyte from accumulating above the electrodes and further prevents the electrolyte from standing at the ends or below the bottom edges of the electrodes except in negligible quantities, it being essential for the efficient operation of the apparatus that the current passes through the series of electrodes and the bodies of electrolyte between the same and not through any portion of electrolyte without the extent of the electrodes.

The cell has in connection with the space above the series of electrodes, an oil-inlet 12, preferably located at an end of the container and the cell has at the opposite end of the container, two oil-outlets 13 and 14, the lower one of which is alined with or slightly above the plane of the tops of the electrodes, for the discharge of surplus electrolyte with the oil.

The upper oil outlet, slightly below the top of the container, provides a space 15 for gases above the level of the oil. A pressure gauge 16 indicates the pressure of gases in the space 15 and a blow-off cock 17 maintains the gases in the cell at a predetermined maximum pressure.

In the space of the cell above the electrodes, nearest the end of the container at which the oil under treatment enters the same, are baffles 18 which in the treatment, function to keep the oil in a condition of agitation whereby to permit of more rapid, more thorough and more uniform absorption of the gas. Part of the baffles may rest directly on the electrodes, as shown, while the others are suspended from the top or roof of the container.

The last mentioned baffles have in their upper portions, small apertures 19 for the circulation of gas in the space 15 above the oil. The baffles are of particular advantage where oil containing water is admitted to the cell for treatment. The water is usually of the nature of a brine, and in passing through the cell in the form of an emulsion, the oil and water are, owing to the presence of the baffles, partially broken and in many cases entirely broken, whereby the water and the oil are effectively separated.

The presence of brine in many oils, particularly sour oils, is also the main reason for the above stated arrangement of the electrodes and for the provision of apertures at the top of the electrodes, it being apparent that the brine is an electrolyte and that it is essential that the electrolyte be confined below a level closely adjacent that of the tops of the electrodes.

The number of electrodes for a given voltage depends largely upon the ohmic resistance of the electrolyte and the electrodes, the decomposition voltage of the electrolyte and several minor indeterminate factors such as polarization, surface conditions, temperature, etc. A one hundred and ten volt cell, for example, may contain thirty-seven electrodes, with a drop or fall of potential for each electrode of approximately three volts. Potentials of 110 volts, 120 volts or 440 volts may be used and under the same condition a 440 volt cell would contain approximately one hundred and fifty electrodes.

It will be understood that any intermediate voltage can be used as well, provided that the ratio of potential to the number of electrodes as stated above, is maintained. An advantage of a cell of the described construction is that it permits the use of potentials in excess of that required for the electrolysis in the cell.

The oil may be supplied to the cell either by gravity or by a constant pressure pump, through the inlet conduit 12. In the drawings, an elevated supply tank is shown at 20.

While the pressure under which the cell operates, apparently does not affect the efficiency of absorption and oxidation of the sulphur compounds in the oil, increase of pressure decreases the rate of evolution of gas and it is therefore desirable to keep the pressure in the cell at a low limit in order not to interfere with the evolution of the desired quantity of gas at a given potential.

In a cell having a capacity of five barrels of oil per kilowatt hour, using a current density of fifty amperes per square foot and three and one tenth volts potential between electrodes, a pressure of five pounds per square inch above atmospheric pressure, was found to give satisfactory results.

It is desirable that the current density be sufficiently low to avoid heating, and in the above given example, a current density of about fifty amperes per square foot was adequate.

In the operation of the cell, the oil being admitted under pressure through the inlet conduit 12, is supported in a separate body 22 upon the electrolyte 21, which as stated before, extends to a level approximately at or closely adjacent to the tops of the electrodes. Any suitable electrolyte, such as caustic soda, sodium carbonate or sodium sulphate may be used.

The current passing from the source of electricity through the bi-polar electrodes and the bodies of electrolyte between the same, generates oxygen. The nascent oxygen rising to the top of the cell mixes with the oil, it being understood that the pressure at which the oil is fed into the container, and the natural pressure of the gases cause an intimate intermixture of the gases with the oil. Excess gases escape by way of the blow-off valve 17 which thus maintains the pressure in the tank at a predetermined maximum. The gases intermixing with the oil, neutralize and render inactive the corrosive sulfur compounds contained in the oil, and the oil being thereby purified to a condition in which it may be handled without harmful effects, is discharged from the container through the outlets 13 and 14.

By reason of the presence of two oil-outlets, one of which is at the electrolyte level and the other at the oil level, the several elements may be maintained at their proper levels throughout the operation.

The several conduits are provided with valves designated in the drawings by the reference numerals 23, 24 and 25, and it is to be understood that in order to maintain the levels, as stated hereinbefore, the valves in the conduits 13 and 14 may be manually operated or a suitable mechanism may be provided to make the regulation automatic.

It is to be understood that, if so desired, the oil may be treated in a tank or container separate from the cell, the gas being generated in the electrolyte as before, and thence conducted to the gas container by means of an appropriate conduit. In this modified operation, the disadvantage of variations in the amount of the electrolyte, is entirely avoided and a more constant composition of electrolyte in treating sour oils which are accompanied by water solutions, is possible.

The operation illustrated in the drawings and hereinbefore described is, however, of distinct advantage in that it provides for a more compact apparatus and the utilization of oxygen, which is thought to be the most desirable agent for treating the oil nearer its source, and therefore, to a relatively larger extent, nascent.

Another advantage of the first described operation is that it gives a more complete de-emulsification action for breaking oils containing emulsions.

What I claim and desire to secure by Letters Patent is:

1. Apparatus for the treatment of oils by electrolysis, comprising an electric circuit, a closed container, and a series of spaced bi-polar electrodes in the container, included in the circuit, there being a space in the container for the presence of a body of oil above the series of electrodes, and the container having two outlets for oil at different elevations, the lower outlet being at or adjacent to the plane of the tops of the electrodes.

2. Apparatus for the treatment of oils by electrolysis, comprising an electric circuit, a closed container, and a series of spaced and apertured bi-polar electrodes in the container, included in the circuit, there being a space in the container for the presence of a body of oil above the series of electrodes, and the container having two outlets for oil at different elevations, the lower outlet being at or adjacent to the plane of the tops of the electrodes.

3. Apparatus for the treatment of oils by electrolysis, comprising an electric circuit, a closed container, a series of spaced bi-polar electrodes in the container, included in the circuit, there being a space in the container for the presence of a body of oil above the series of electrodes, and the container having an inlet for the admission of oil to the oil-space, and means in the oil-space to cause agitation of the oil entering through the inlet.

4. Apparatus for the treatment of oils by electrolysis, comprising an electric circuit, a closed container, a series of spaced bi-polar electrodes in the container, included in the circuit, there being a space in the container for the presence of a body of oil above the series of electrodes, and the container having an inlet for the admission of oil to the oil-space, and baffles in the oil-space in the path of oil entering through the inlet.

5. Apparatus for the treatment of oils by electrolysis, comprising an electric circuit, a closed container, a series of spaced bi-polar electrodes in the container, included in the circuit, there being a space in the container for the presence of a body of oil above the series of electrodes, and the container having an inlet for the admission of oil to the oil-space, and baffles projecting alternately from the plane of the tops of the electrodes, and from the top of the container, in the path of oil entering the oil-space through the inlet.

6. Apparatus for the treatment of oils by electrolysis, comprising an electric circuit, a closed container, a series of spaced bi-polar electrodes in the container, included in the circuit, there being a space in the container for the presence of a body of oil above the series of electrodes, and the container having an inlet for the admission of oil to the oil-space and an outlet defining a gas-space above the body of oil, and baffles in the oil-space, in the path of oil entering through the inlet, certain baffles extending in the gas space and having apertures for the passage of gas.

7. Apparatus for the treatment of oils by electrolysis comprising an electric circuit, a closed interiorly non-conductive container, a series of spaced bi-polar electrodes dividing the lower portion of the container, the outer electrodes of the series being connected in the circuit, overflow means to restrict the level of an electrolyte to said lower portion of the container, leaving an oil space above the same, overflow means to restrict the level of oil in said space, leaving a space for gases in the upper portion of the container, and pressure-regulating means to maintain a maximum pressure above atmospheric, in the gas space.

8. Apparatus for the treatment of oils by electrolysis comprising an electric circuit, a closed interiorly non-conductive container, a series of spaced bi-polar electrodes dividing the lower portion of the container, the outer electrodes of the series being connected in the circuit, overflow means to restrict the level of an electrolyte to said lower portion of the container, leaving an oil space above said portion and a space for gases above the oil space, and pressure regulating means to maintain a maximum pressure, more than atmospheric, in the gas space.

9. Apparatus for the treatment of oils by electrolysis comprising an electric circuit, a closed interiorly non-conductive container, a series of spaced bi-polar electrodes dividing the lower portion of the container, the outer electrodes of the series being connected in the circuit, overflow means to restrict the level of an electrolyte to said lower portion of the container, leaving an oil space above said portion and a space for gases above the oil space, pressure regulating means to maintain a maximum pressure, more than atmospheric, in the gas space, and means for entering oil under pressure into the oil space.

In testimony whereof I have affixed my signature.

WARREN F. BLEECKER.